(12) United States Patent
Kress (10) Patent No.: US 6,439,631 B1
(45) Date of Patent: Aug. 27, 2002

(54) VARIABLE-PITCH PICK AND PLACE DEVICE

(75) Inventor: Lothar Kress, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/518,436

(22) Filed: Mar. 3, 2000

(51) Int. Cl.$^7$ .......................... B65B 35/38; B65G 47/26
(52) U.S. Cl. .................. 294/65; 294/87.1; 294/907; 414/416.02; 414/754
(58) Field of Search .................. 294/65, 81.2, 81.6, 294/87.1, 907; 414/404, 416.01–416.03, 416.07, 627, 754

(56) References Cited

U.S. PATENT DOCUMENTS

| | | | |
|---|---|---|---|
| 3,610,673 A | * 10/1971 | Strombeck et al. | ............ 294/65 |
| 3,685,624 A | * 8/1972 | Paddock | .................. 294/65 X |
| 3,860,280 A | * 1/1975 | Karlsson | .................. 294/65 X |
| 5,073,079 A | * 12/1991 | Akagawa | ............... 414/416.07 |
| 5,290,134 A | 3/1994 | Baba | |
| 5,920,192 A | 7/1999 | Kiyokawa | |
| 6,068,317 A | * 5/2000 | Park | ......................... 294/65 X |

OTHER PUBLICATIONS

"Conductive tubing prevents troubles caused by static electricity." SMC Pneumatics Inc., 2 pages, revised Apr., 1998.

* cited by examiner

*Primary Examiner*—Johnny D. Cherry
(74) *Attorney, Agent, or Firm*—Klarquist Sparkman, LLP (57) ABSTRACT

Improved variable-pitch pick and place devices may include one or more improvements such as a mechanical linkage such as pantograph linkage, the linkage itself linked to a plurality of device-gripping mechanisms arranged in a row so as to keep uniform, though variable, spacing between the device-gripping mechanisms, with the number of such mechanisms being increased relative to the number of parts in the linkage for reduced tolerance stack-up and improved positioning accuracy. The horizontal position of the linkage may be fixed at a position not at an end thereof, and desirably within the middle third or at the middle thereof. The linkage may be controlled at three points. These points may include a vertically flexible but horizontally fixed link to a supporting structure at the middle of the pantograph, a link at one end of the pantograph to one side of an endless loop of timing belt, and a link at the other end of the pantograph to the other side of the endless loop of timing belt. The links to the timing belt at the ends of the pantograph may be made via two end-most device-gripping mechanisms. The position of the timing belt may be controlled by a servomotor with a position encoder, the servomotor controlled by a controller such as a computer. The device-gripping mechanisms may include a vacuum tip grounded and supplied with vacuum by an electrically-conductive vacuum tube.

33 Claims, 7 Drawing Sheets

VARIABLE-PITCH PICK AND PLACE DEVICE

FIELD

This invention relates to fabrication and testing of integrated circuit devices, and particularly to pick and place devices for assisting in processing and testing of integrated circuit devices.

BACKGROUND

Modem electronics devices, such as integrated circuits or semiconductor "chips" are rapidly increasing in performance and functionality, and in production quantity, while simultaneously decreasing in size and unit cost. To increase the productivity and decrease the cost of electronic devices, it is desirable to decrease the time and cost of all operations in the production cycle.

Cost efficiency and productivity of processes performed on individual chips, such as burn-in, various test processes, binning, and the like, require precise, high-throughput handling of many chips. Traditionally, chips were transported in a container such as a magazine—a container typically designed to hold a row of chips placed end-to-end by sliding them one-by-one into one end of the container. Chips were removed from a magazine and separated from one another for processing, and replaced in a magazine after processing, by the force of gravity.

Chip handling systems which utilize the force of gravity to separate and transfer the electronic devices have at least two inherent disadvantages.

First, since modem electronic devices have become smaller and lighter than before, an individual electronic device may not have sufficient weight to be efficiently separated from the others by gravity. This may cause jamming. If such jamming occurs, it is usually necessary to stop the operation of the system to clear the jam, thus causing a serious loss of time and efficiency. Furthermore, the risk of jamming is greatly increased due to the configuration of the new types of electronic devices, such as chips with leads (pins) on all sides of the package, instead of two opposing sides as in the conventional dual in-line package (DIP).

Second, to minimize jamming, the outer surface of the electronic device must be made sufficiently smooth so as to not cause any friction or unwanted engagement with other devices or the magazine. However, this is also impractical since the plastic molded packages of the devices often have some burrs remaining from the production process and it is not generally economically practical to completely eliminate such burrs.

More recently, trays holding arrays of chips have been used for transport and handling of chips instead of magazines. The individual chips occupy individual cells within the array, and are removed from and replaced in the tray by a "pick and place" device. A pick and place device typically employs multiple individual vacuum grippers, arranged in a row, to pick up and to place a row or column of chips. The pitch or spacing between the cells in the array is typically fixed, although the pitch may vary between different tray types. Also, the chips may have to be transported from one tray or other holder, such as a precisor, multi-track chip runway or the like, to another holder having a different pitch. This may occur as part of a processing, testing, or packaging operation or the like.

Some pick and place devices with multiple grippers have grippers positioned at a fixed pitch. The pitch of such devices may match the required pitch of an associated machine or process, or of a tray for such machine or process. However, a fixed-pitch pick and place device may often not match the pitch, of a tray or other type of chip holder, with which it must be used. In particular, where a tray or other chip holder does not match the pitch of a precisor, a multi-track runway, or any other chip holder to which the chips must be transferred, a fixed-pitch pick and place device will be mismatched to at least one of the chip holders. This results in the pick and place device having to pick-up or set-down a row of chips one at a time rather than simultaneously.

Variable-pitch pick and place devices have been developed, such as the device disclosed in U.S. Pat. No. 5,290,134, to provide the capability of simultaneous pick-up and deposit even where the pitch of one holder may differ from that of another holder. Nevertheless, a need exists for improved variable pitch pick and place devices.

SUMMARY

A variable-pitch pick and place device with increased positioning precision and increased flexibility, with decreased complexity and cost and maintenance requirements, and with provision for electronic and thus easily-programmable pitch control is provided by the various aspects and embodiments of the present invention.

According to one embodiment, a variable-pitch pick and place device includes a plurality of device-gripping mechanisms supported in a horizontal row, the horizontal positions of the mechanisms being electronically controlled so as to maintain uniform, though variable, spacing or pitch between the device-gripping mechanisms. The desired pitch may be set via a look-up table stored in a controller such as a computer. An operator may select a tray type, or a machine or process type or the like, to trigger a look-up operation in the look-up table to obtain a value used to control the pitch. The computer may then use the value from the table to cause the adjustment of the pitch between the grippers to match a desired pitch. A controller or computer may also be used to control the pitch regardless of whether information on the desired pitch and/or the value used to control the grippers is obtained from a look-up table, entered manually, or calculated, or obtained by other means.

According to another embodiment, a variable-pitch pick and place device has a mechanical linkage, such as a scissors or pantograph linkage, itself linked to a plurality of device-gripping mechanisms so as to maintain uniform, though variable, spacing or pitch between the device-gripping mechanisms. The links to the plurality of device-gripping mechanisms are positioned so as to allow an increased number of device-gripping mechanisms to be positioned along the pantograph linkage relative to the number of links in the linkage. This yields improved positioning precision and decreased total number of linkage parts in the device.

According to yet another embodiment, a variable-pitch pick and place device has mechanical linkage such as a scissors or pantograph linkage, itself linked to a plurality of device-gripping mechanisms so as to keep uniform, though variable, spacing between the device-gripping mechanisms, and also linked to a supporting structure, the link between the linkage and the supporting structure not being at an end of the linkage, but desirably being within the middle third and most desirably at the middle of the linkage.

According to another aspect of an embodiment, a variable-pitch pick and place device may have a mechanical linkage, itself linked to a plurality of device-gripping mechanisms so as to keep uniform, though variable, spacing between the device-gripping mechanisms, and the position of the linkage may be controlled through three links to the linkage, one relatively near the middle compared to the other two, and two relatively near the ends, compared to the one.

According to another embodiment, in a device having a mechanical linkage such as a scissors or pantograph linkage for keeping uniform, though variable, spacing between electronic device-gripping mechanisms, the extension and contraction of the linkage is controlled by a timing belt or, if desired, a chain. The belt may be a continuous loop, the loop having two sides defined between a drive pulley or sprocket and an idler pulley. One end of the linkage may be attached to one side of the belt, the other end to the other. The linkage may also be anchored horizontally at the center thereof, such that the linkage is controlled from three points, providing improved position control due to decreased stack-up of mechanical tolerances. A servo or the like may be used to control the motion of the drive pulley. An encoder on the shaft of the servo motor can allow precise electronic control of the pitch of the electronic device gripping mechanisms. Such electronic control lends itself to programmed or otherwise automated pitch changes. As an aspect of the embodiment, the pitch of the grippers may be controlled using a programmed computer.

According to another embodiment, movable portions of device-gripping mechanisms are supplied with both vacuum and electrical ground via a single structure, such as an electrically conductive vacuum tube, eliminating the need for separate grounding wires for every such movable portion.

The invention is directed to these and other new and nonobvoius aspects, both individually and in combination, of improved variable-pitch pick and place apparatuses as disclosed herein. The above and other aspects, features, advantages, and benefits of the present invention will be apparent from the description bellow, which proceeds with reference to following figures:

DETAILED DESCRIPTION OF EMBODIMENTS

Figure 1:
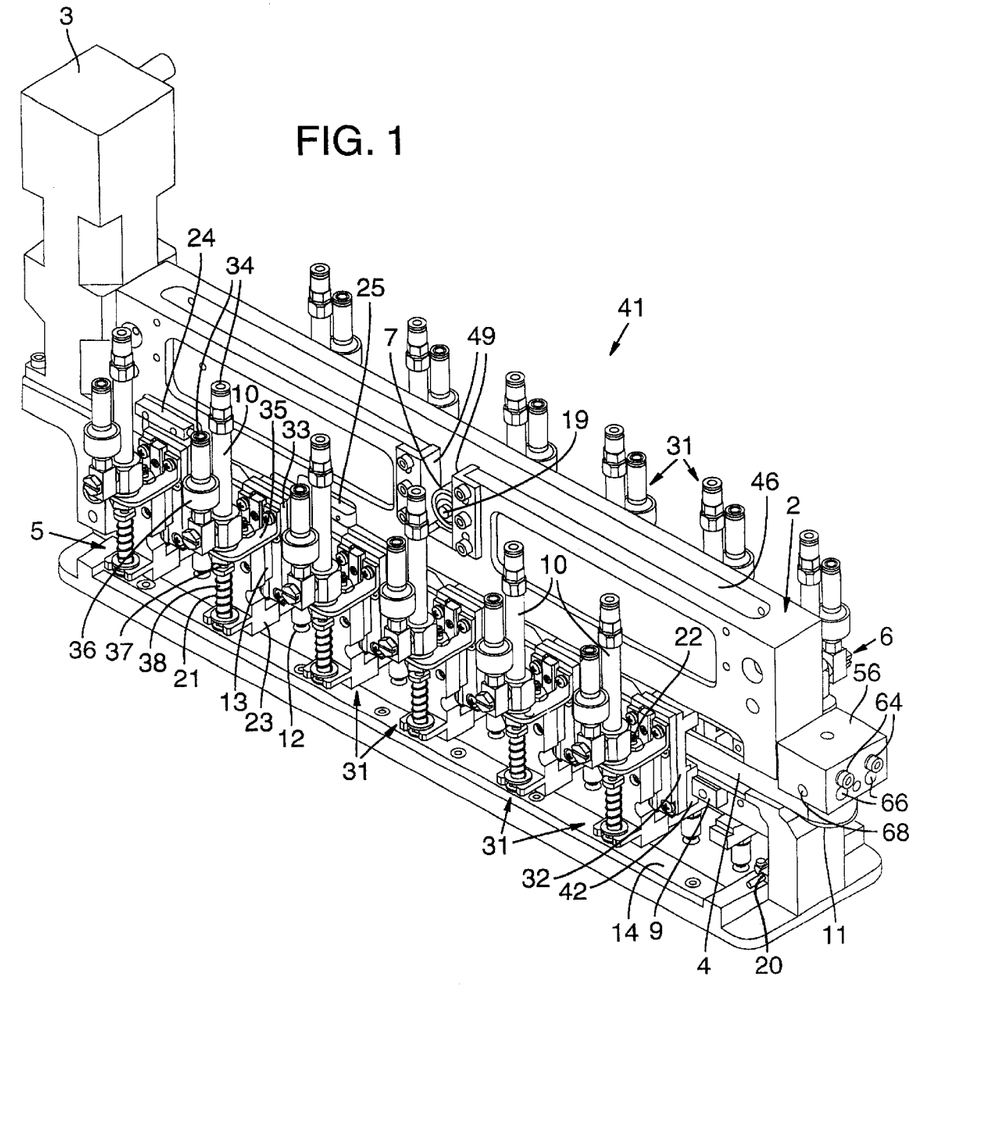
FIG. 1 is perspective view of a pick and place device according to one embodiment of the present invention.

An example embodiment of a pick and place head 41 for a pick and place device is shown in perspective in FIG. 1, including twelve individual example gripper mechanisms, some of which are indicated by reference character 31. An example embodiment of a single gripper mechanism 31 is shown in detail in the perspective view of FIG. 2 in retracted position, and in FIG. 3 in extended position.

Figure 2:
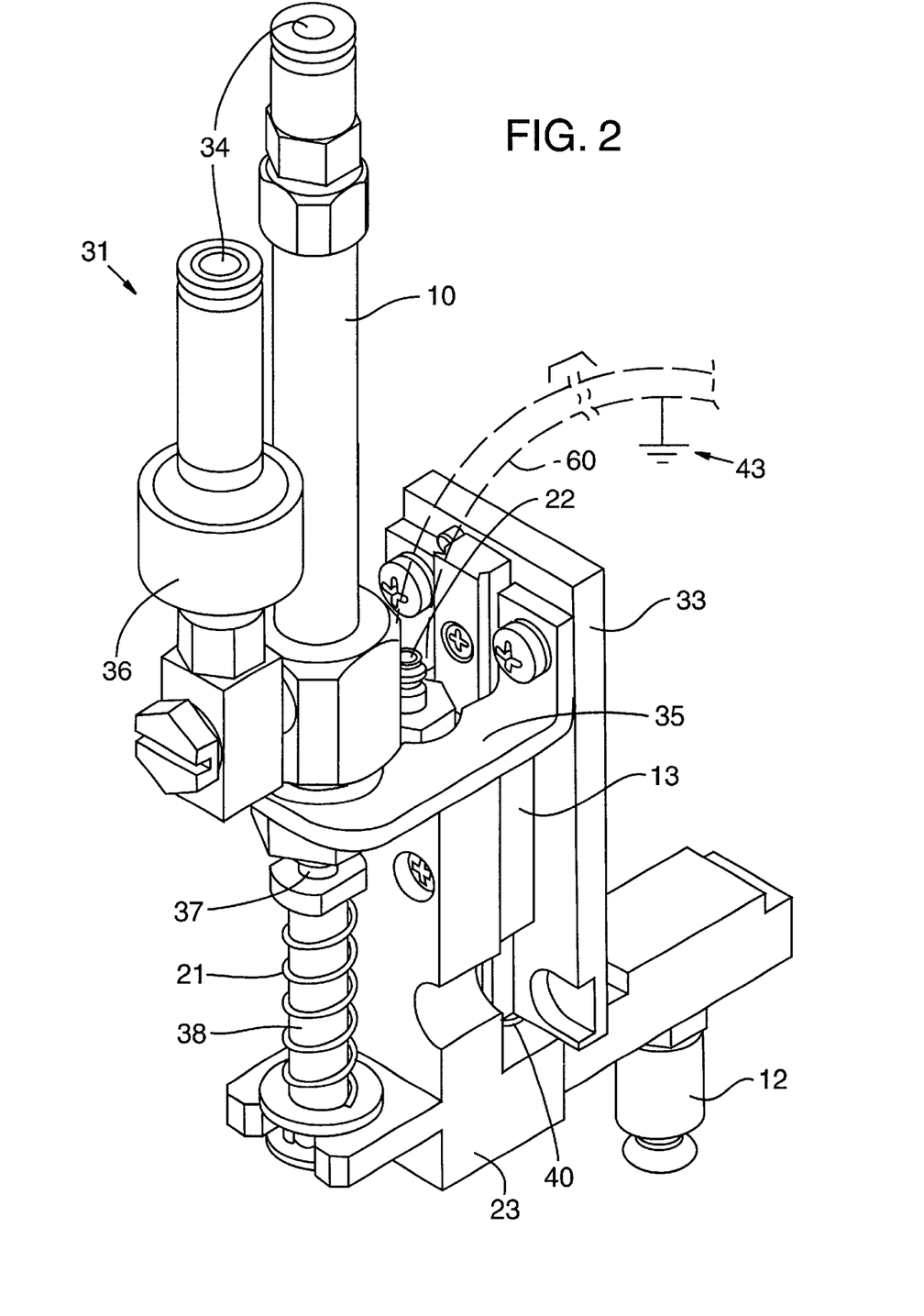
FIGS. 2 and 3 are perspective views of a gripper mechanism that may be employed in an embodiment of the present invention, FIG. 2 with a movable portion retracted, FIG. 3 with the movable portion extended.

The head 41 of FIG. 1 comprises a support structure in the form of a frame 2 on which are supported the illustrated twelve gripper mechanisms 31, six on one side and six on the other side of the frame. Each gripper mechanism 31 includes a gripper in the form of a vacuum tip 12 (FIG. 2). The vacuum tips 12 of the gripper mechanisms on each side of the frame 2 extend toward the center of the frame such that the vacuum tips from both sides are aligned together in a single row.

Figure 4:
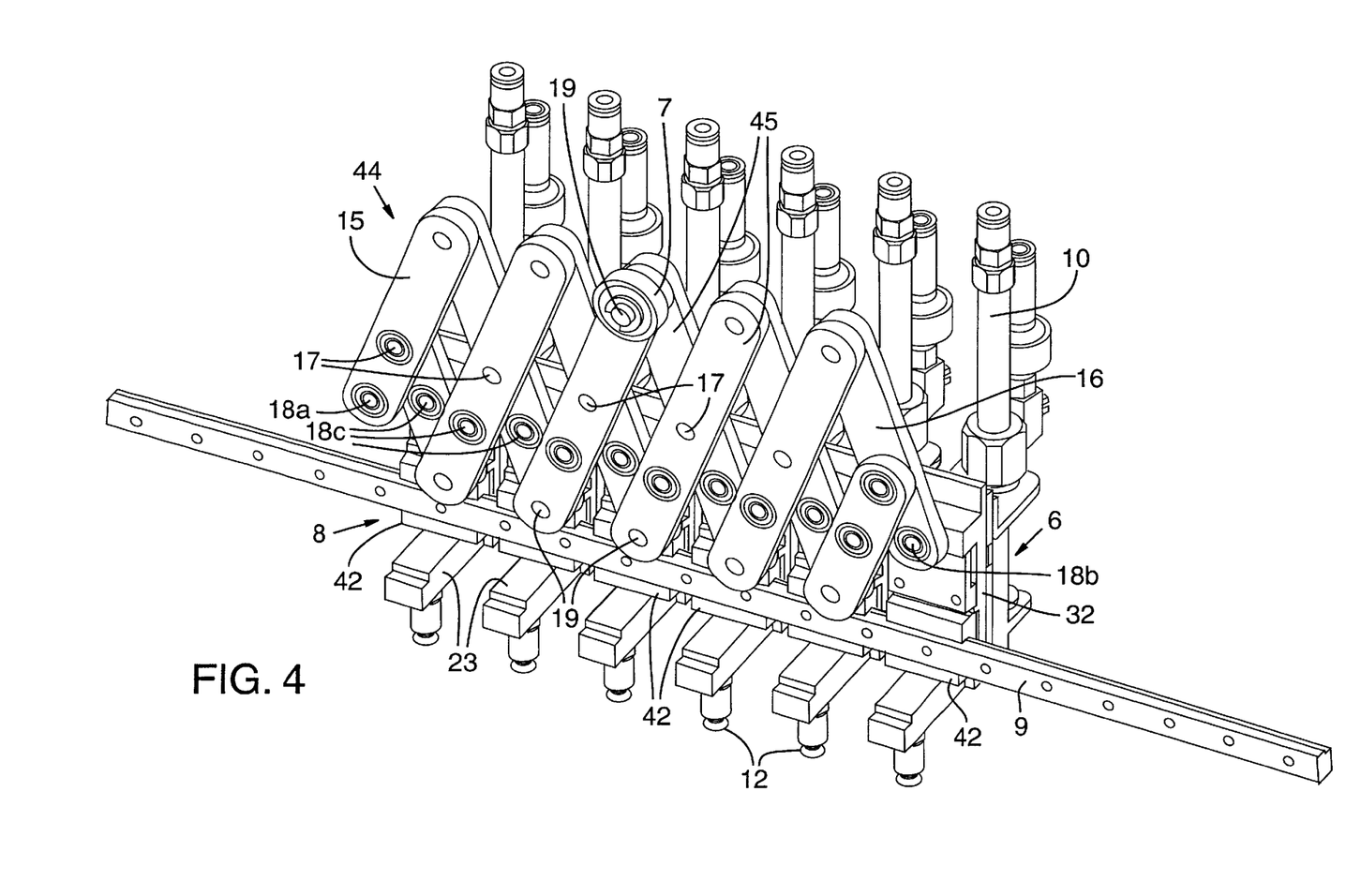
FIGS. 4 and 5 are perspective views of certain components, including a scissors or pantograph linkage, useful in an embodiment of the present invention, FIG. 4 with the pantograph linkage contracted, FIG. 5 with the pantograph linkage extended.
Figure 5:
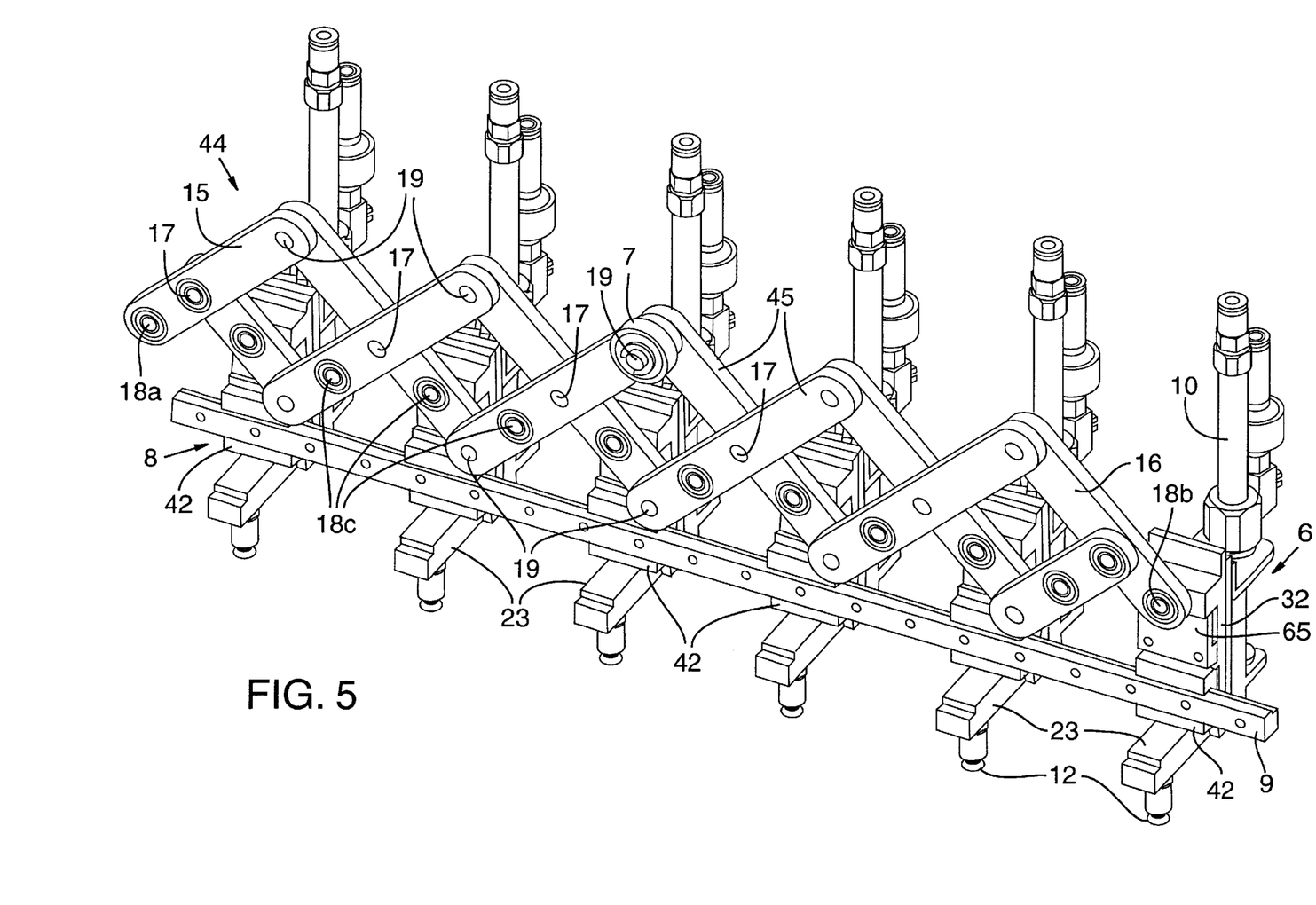

FIGS. 4 and 5 show the six example gripper mechanisms on the back-most side of FIG. 1, but with the frame 2 and the six gripper mechanisms from the front-most side of FIG. 1 omitted. FIG. 4 shows the back six gripper mechanisms in a retracted position, while FIG. 5 shows an extended position. As alternate embodiments, more or fewer gripper mechanisms may be included and such mechanisms may assume a form other than shown in these figures. Also, more than one row of gripper elements may be provided.

As shown in FIGS. 1 and 2, in the example gripper mechanisms 31, each gripper mechanism includes anchor block 32 to which a vertical motion or "z-" actuator is attached. One form of such an actuator includes an air cylinder 10 mounted by a bracket 35 (FIGS. 2, 3) to a sub-plate 33 which is coupled to an anchor block 32 (FIG. 1). Air cylinder 10 includes a piston 37 with a piston extension 38. Air ports 34 (FIGS. 2, 3) are in fluid communication with the cylinder 10 to allow delivery of driving air for driving the cylinder 10 in both the upward and downward directions in this embodiment. A fixed flow control valve 36 sets the speed of the downward stroke of the cylinder 10, which aids in preventing damage to electronic devices handled by the gripper mechanisms 31. In another embodiment, valve 36 is adjustable. As an alternative embodiment, the cylinder may also be driven only in one direction, (e.g. downwardly), with a biasing mechanism being used to return the cylinder.

Figure 3:
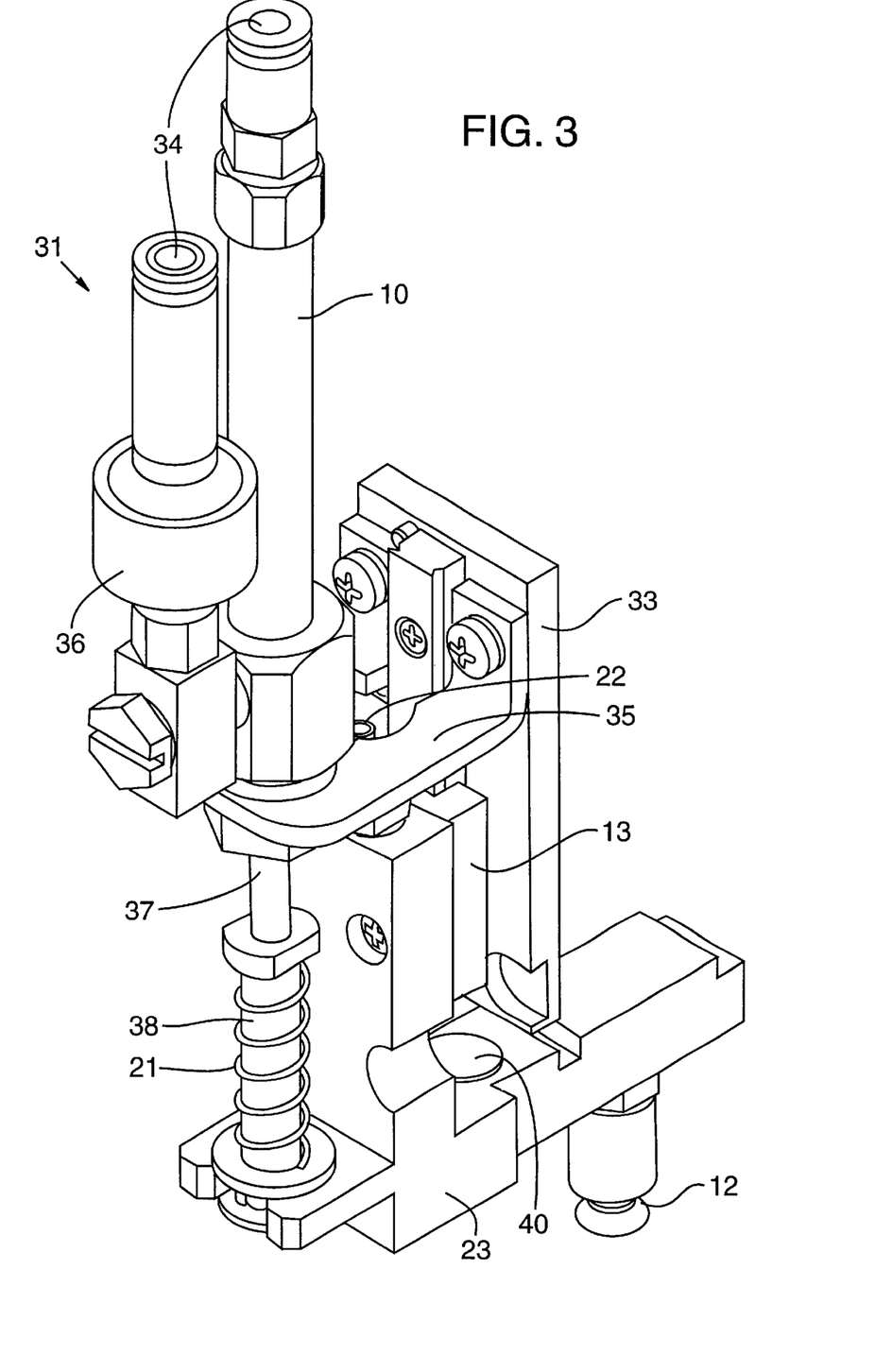

The vertical position of the piston 37 of the cylinder 10 is transmitted to a vertically movable portion 23 of the gripper mechanism 31. The downward motion of the piston 37 is transmitted via the piston extension 38 to portion 23. A limiting spring 21 serves to limit the downward force applied to the movable portion 23, to aid in preventing damage to electronic devices handled by the gripper mechanism. The movable portion 23 is slidably supported on the sub-plate 33 by a linear bearing 13 for upward and downward movement as the piston is operated.

An example gripper in the form of a vacuum tip 12 (FIGS. 2, 3) is mounted on the vertically movable portion 23. The vacuum tip 12 is in fluid communication, through a passage in the movable portion 23, with the interior of a hose fitting 22 mounted on movable portion 23. Accordingly, suction may be supplied to fitting 22 via a hose 60 (shown in FIG. 2 in dashed lines) to provide suction at vacuum tip 12. In this example embodiment, the hose 60, the hose fitting 22, the body of the movable portion 23, and the vacuum tip 12 are optionally and desirably formed of electrically conductive material, with the hose connected (at the end not shown but indicated schematically by ground 43) to a grounded structure (not shown), to protect the handled electronic devices from electrical damage from electrostatic discharge, stray currents, or the like. This feature eliminates the need for a grounding wire for each movable portion 23 of each gripper mechanism 31 separate or discrete from the hose 60 by providing both a vacuum and a grounding path with a single element (the vacuum hose). The vacuum hose may be any suitable available conductive tubing, such as anti-static conductive nylon or polyurethane, such as the polyurethane tubing available from SMC Pneumatics, Inc., of Indianapolis, Ind. under the designation TAU. Related components, such as fitting 22 and other fittings, may be of metal or other suitable electrically conductive materials. The tip 12 has a suction cup end formed of a flexible material, such as conductive polyurethane, for example.

In the operation of an individual example gripper mechanism 31, air is supplied to the cylinder 10 to lower the movable portion 23 such that the gripper 12 approaches an electronic device to be gripped. A common hard stop such as in the form of a stop rail 14 is provided on the frame 2 in the example embodiment of FIG. 1 for each set of six gripper mechanisms, providing a reliable means for limiting the extended position of each movable portion 23 to match the extended positions of the other movable portions 23. A vacuum is supplied to the vacuum fitting 22 to cause the vacuum tip 12 to grip the electronic device. Air is then supplied to the cylinder 10 to retract the piston extension 38 and raise the movable portion 23 with the device to be gripped held by the vacuum tip 12. An individual stop 40 (FIGS. 2, 3) engages the lower ledge of sub-plate 33 and limits the upward travel of the movable portion 23. With the movable portion in the retracted position, the stop rail 14 (FIG. 1) also functions as a crash guard by extending below the lowest portion of the vacuum tip 12 in the retracted position. Optical through-beam sensors, such as optical through-beam sensor 20 (FIG. 1), may be used to detect, by beam interruption, for example, whether all of the movable portions 23 are up, and/or whether any are down, thus providing feedback on the operation of the movable portions 23.

The individual example gripper mechanisms may be operated individually when selective transfer of electronic devices is desired, by selectively supplying the desired air pressure and vacuum to the individual gripper mechanisms. This allows the example embodiment variable pitch pick and place head to perform sorting for testing, binning, and similar operations and to pick up a full load of devices from trays that may have gaps in various rows, with, for example, devices picked up from more than one row of a tray in order to fully load the grippers.

The individual example gripper mechanisms are supported for movement along the direction of the row of vacuum tips 12. In the illustrated example, the gripper mechanisms (FIGS. 1 and 4) are supported slidably on a guide rail 9, via a guide block 42 attached to each respective anchor block 32, with one rail 9 for each of the two sets of six gripper mechanisms. The guide block 42 and the guide rail 9 together constitute a form of linear bearing 8, as best shown in FIGS. 4 and 5. The guide rail is an elongated member having a longitudinal axis.

Figure 6:
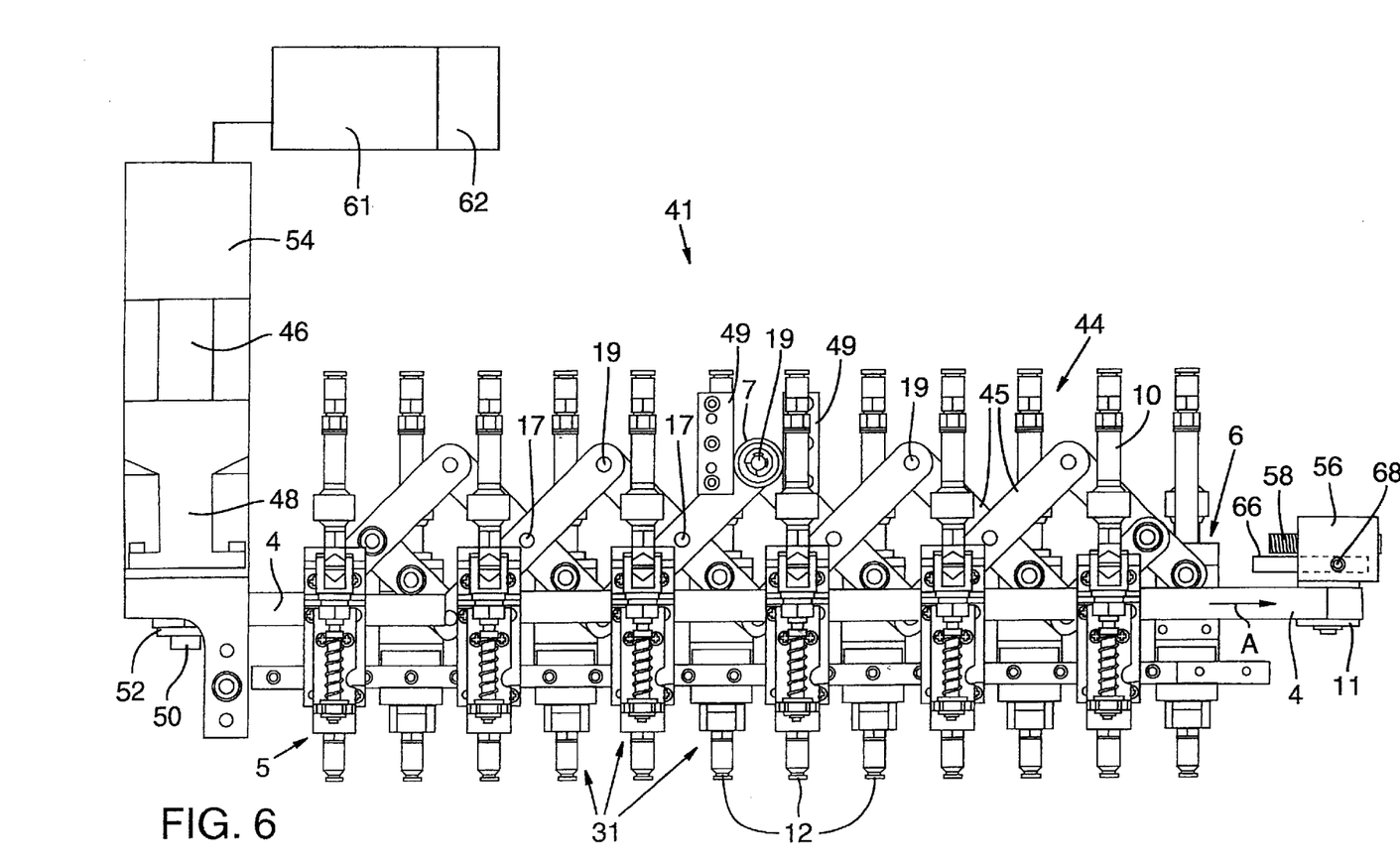
FIG. 6 is an elevation view of certain components, including a scissors or pantograph and a controller, useful in an embodiment of the present invention.

With reference to FIGS. 4, 5 and 6, even spacing or pitch between the gripper mechanisms is preserved in this example by a linkage desirably arranged in the form of a scissors mechanism or pantograph 44 comprised of rigid beams (some being indicated as 45) linked together to form a series of parallelograms. The parallelograms thus formed are desirably in a plane which may be horizontal or in some other orientation, such as desirably in a vertical plane, as shown in FIGS. 4 and 5. The pantograph 44 may then be disposed within a central slot 46 in the center of the frame 2 of the example embodiment of FIG. 1, allowing the head 41 to be of a narrower width than with a horizontally disposed pantograph. As shown in FIGS. 4 and 5, each beam within the interior portions of the illustrated pantograph is pivotally linked to another beam both at a crossover point, some being indicated at 17, located at the midpoint of each beam and at both upper and lower pivot points (such as indicted at 19 for some of the beams) located at the ends of the beam. The beams at the ends of the pantograph are linked similarly, but are shortened so as to extend only to the crossover point, or in the case of outermost beams 15 and 16, to respective link points 18a, 18b (FIGS. 4, 5). Alternative pitch control devices may of course be employed for the gripper elements, such as other linkage mechanisms or a screw-driven positioning block for each gripper mechanism, for example, but a pantograph linkage is generally desirable for overall simplicity and reliability.

In the illustrated pantograph embodiment, the link points 18c at which the gripper mechanisms are pivotally attached via pins to the pantograph 44 are located midway between the crossover point 17 and the lower of pivot points 19 on each beam. Link points 18a, 18b are at the same elevation. This location for the link points 18a, 18b and 18c provides twelve of the link points with only five total parallelograms in the pantograph 44 (recall that the front-most set of six gripper mechanisms is not shown in FIGS. 4 and 5). This location for the link points 18a, 18b and 18c provides about twice as many link points for the same number of pantograph beams as compared to the less desirable option in which the link points for the gripper mechanisms are at the midpoints 17. The link positions at link points 18c provides two gripper link locations for every parallelogram, plus two more link locations at 18a, 18b in the respective last parallelograms, as compared to one link location for every parallelogram, plus one more at the last parallelogram. In other words, the number of complete parallelograms in the structure is one less than half the number of gripper link locations, as compared to simply one less than the number of link locations. As this embodiment is merely a desirable example, other link points may also be used, to achieve an equal or even greater increase in the number of link points per parallelogram. Increased link points per parallelogram provide more accurate position control, since fewer links mean that a lower total number of mechanical tolerances influences the total positioning error. Less total parallelogram parts also provides a lower cost, lower maintenance head.

The position of the pantograph 44 in the direction along the row of vacuum tips 12 relative to the frame 2 is controlled in this example by a ball-bearing supported roller 7 (See FIG. 1), in this case attached to uppermost pivot point 19 or a first point at the center of the pantograph 44. The roller 7 rolls vertically between two roller plates 49 attached to the frame 2 of the example embodiment of FIG. 1. The roller 7 thus serves to locate or fix the position of the first point and thus of the pantograph 44, in the direction along the row of vacuum tips 12, by a link at a position at or near the middle of the pantograph. It is desirable (but not precluded) that this first point or horizontal locating link not be at an extreme end of the pantograph 44 but rather at this center location, or at least within the middle third of the length of the pantograph so that tolerance stack-up is further reduced compared to positioning a horizontal locating link at or near an end of a pantograph linkage. Positioning a horizontal locating link at the midpoint also preserves the midpoint of the row of vacuum tips 12 during adjustment of the pitch of the tips 12. The roller 7 restrains the first point of the linkage against movement in a direction along the longitudinal axis of the rail.

FIG. 6 is an elevation view of certain example components related to controlling the extension of the pantograph and the resulting spacing between adjacent ones of the vacuum tips 12, including the gripper mechanisms 31, the guide rails 9 (only one visible), and the pantograph 44 without the frame 2, but including a motor housing 3, a timing belt 4, and an idler pulley 11. The timing belt 4 constitutes one form of a ten side force transmitting member and extends in a loop around a drive pulley 52, past the gripper mechanisms 31, and around the idler pulley 11. The belt 4 may be a continuous belt. Desirably, the belt may be an open ended loop for easier assembly and replacement. In this case, for example, the two ends of the belt may meet in one of the outermost gripper mechanisms 5, 6 and are held in place, for example, by a clamp. Only the frontward half of this loop 4 is visible in FIG. 6. Tension on the loop of the timing belt 4 is established by two springs 58, situated in respective bores 64. The idle pulley block 56 slides on two pins 66 that are mounted to the frame 2. After block 56 is positioned such that the springs appropriately tension the belt, the idle block is locked in position, such as by set screws 68 which are tightened to clamp the block to the pins.

In this example embodiment, the extension of the pantograph linkage is controlled by the positions of the outermost gripper mechanisms 5 and 6, which in turn are controlled by the position of the timing belt 11. The outermost gripper mechanism 5 is attached to the front-facing side of the loop (visible in the figure) of the timing belt 4, such as by a clamp 65 or other suitable means at a second location point. The outermost gripper mechanism 6, at the opposite end of the pantograph 44, may be similarly attached to the rear-facing opposite side of the loop (not visible in FIG. 6) of the timing belt 4 at a third point or location.

When the timing belt is rotated such that the front-facing surface of the belt moves to the right in FIG. 6, as shown by the arrow A, gripper mechanism 5 is moved toward the right in the figure, while gripper mechanism 6 is moved an equal distance to the left, thus contracting the pantograph 44 and uniformly reducing the pitch of the vacuum tips 12. Motion of the timing belt in the opposite direction expands the pantograph 44 and increases the pitch of the vacuum tips 12. Thus, the relative horizontal positioning and the expansion and contraction of the pantograph linkage is controlled in this specific example at three points: at the first point or location by the roller 7 which rolls against the roller plates 49, and at the outermost gripper mechanisms 5 and 6, rather than at only two points. That is, moving the timing belt adjusts the spacing between the second and third points along the longitudinal axis of the rails, resulting in an adjustment in the length of the linkage and of the spacing between the gripper mechanisms. Although not required, the use of three-point control reduces positioning errors due to stack-up of mechanical tolerances.

The position and motion of the timing belt 4 are controlled by a motor such as a servo motor 46 positioned within a motor housing 3. The servo motor 46 drives a drive shaft 50 through a gearbox 48. The drive pulley 52 that controls the motion of the timing belt 4 is mounted on the driveshaft 50. The servo motor 46 also drives an encoder 54 for detecting and controlling the position and motion of the servo motor 46 and the driveshaft 50 and drive pulley 52.

A controller 61 may be employed to electronically control the position of the servo motor 46. The controller may be in the form of a dedicated chip or a portion of a chip or the like, or of a programmable computer or the like, or virtually anything in between. The controller, of whatever type, may include or be connected to a user interface 62. The controller may have a look-up table with values stored therein that correspond to amounts of rotation or the positions of the shaft 50 that correspond to desired pitch settings. The user may enter a desired tray type or a desired pitch measurement or the like to trigger a look-up operation in the look-up table in the controller 61. The resulting value may then be used by the controller to determine and control the motion of the servomotor 46 so as to set the desired pitch. Alternatively, the controller may calculate the required motion or position of the servomotor 46 directly. The desired pitch information may be delivered to the controller from any source. Limit switches 24 and 25 (FIG. 1) may be used to detect the maximum and minimum extension of the pantograph by detecting the presence of the gripper mechanism 5. One of the limit switches 24, 25, may also serve as a home switch, to find a defined position after power-up, in the event that the motor's encoder/controller requires it.

Use of a non-slip tensile force-transmitting member such as the timing belt 4 allows efficient, direct conversion of rotary to linear motion and vice-versa, so that fine control of vacuum-tip pitch may be provided via the rotary servo motor 46 and the rotary encoder 54. This allows easy electronic and programmable control of the pitch, based on control of the servo motor 46. Furthermore, the pitch is always and immediately adjustable to virtually any pitch within the total range of adjustment, since the adjustment mechanism does not require nor rely on mechanical stops to define the pitches between which adjustment is desired. Of course other tensile-force transmitting members may be used, such as chain or similar drive mechanisms. Although less desirable, other drive mechanisms, including those with stops, may be used.

The present invention, as illustrated in the various examples above, provides improved positioning precision and improved flexibility in setting the pitch of a variable pitch pick and place device. The present invention is useful in any context where relatively large numbers of ICs need to be handled and/or sorted quickly and efficiently, particularly where a transfer between holders or containers of different pitch is required. The pick and place device of the present invention may thus be used to move or selectively move ICs to and from all kinds of holders or containers, including trays, burn-in-boards, and machine components such as precisors and multi-track IC runways. Devices typically utilizing such transfers include many or even most back-end processes, including, for example, Bum-in Board Loaders and Unloaders, Trim-Form Machines, and Test Handlers.

Figure 7:
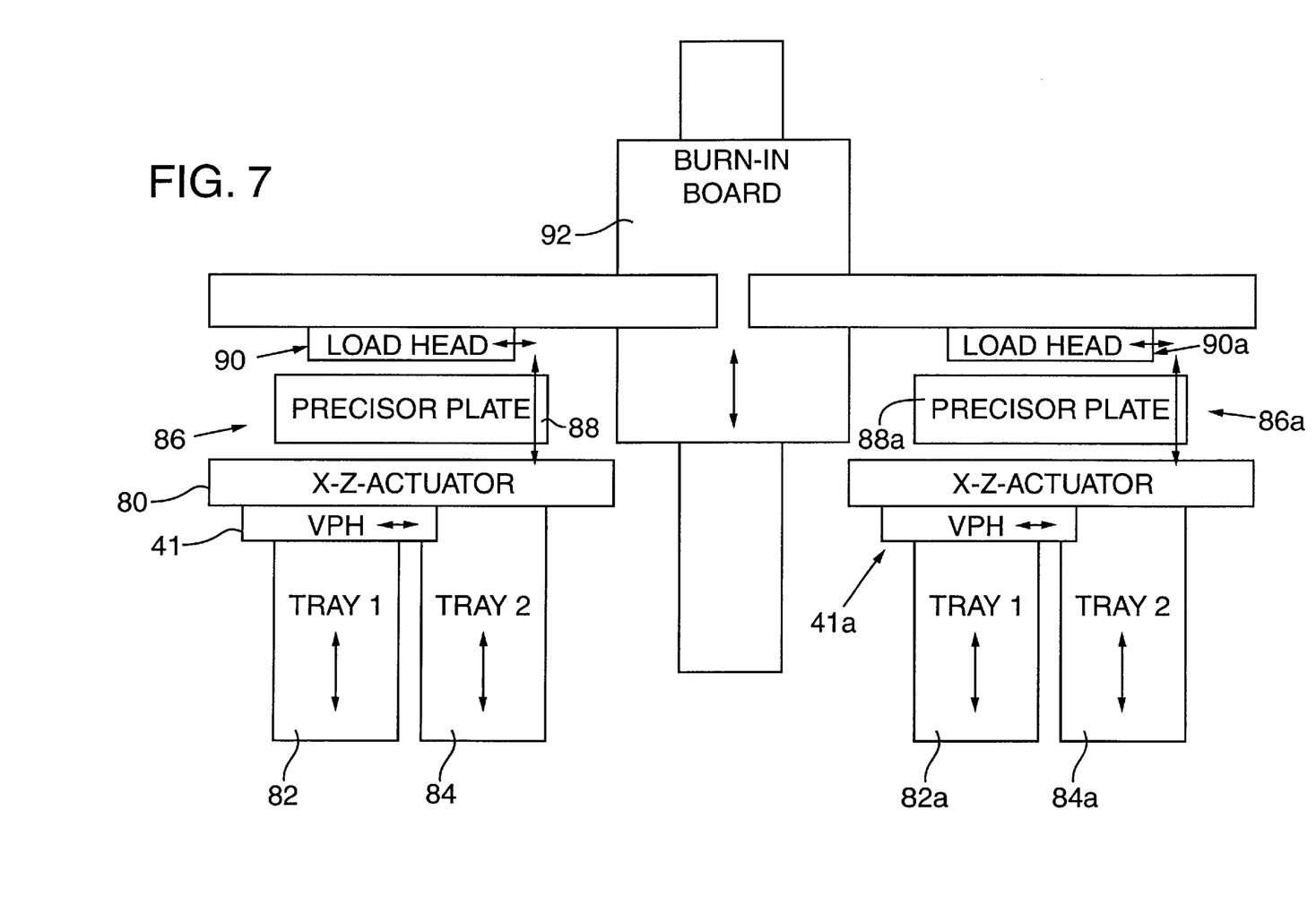
FIG. 7 is a schematic plan view of an example application of an embodiment of the present invention.

An example application is illustrated in a schematic plan view in FIG. 7. A variable pitch pick and place head (VPH) 41 is supported on an x-z actuator 80 for controlled motion in the x- and z-directions. Two VPHs (41, 41a) may each be used at once in parallel for higher throughput, with each VPH picking devices from respective sets of two or more trays, such as trays 82, 84 and 82a, 84a. After a desired load of devices is picked by either VPH, the respective VPH, with the aid of the respective x-z actuator, moves the devices all at once to a respective precisor 86, 86a. Each precisor comprises a plate 88, 88a with precisely positioned cavities for holding the devices. The cavities typically have sloped sides so that gravity aligns the devices as they drop into the cavities in the precisor plate. The respective load head 90, 90a then moves the devices all at once from the precisor to a burn-in board 92 for processing. The variable pitch of the VPH allows it to pick up all devices in a given tray row at once, and to set down all the devices it can carry into the respective precisor all at once, regardless of any pitch mismatch, thus markedly improving loading speed over non-variable pitch designs.

Variations within the scope and spirit of the invention discussed above will be apparent to those of skill in the art. For example: Not all of the gripper mechanisms need be movable with respect to the frame. One such gripper mechanism could, for example, be fixed relative to the frame, if desired, with the others being supportable by a pantograph or other structure so as to be movable along a first axis to establish a desired pitch between all of the grippers (including the fixed position gripper). Thus, at least a plurality of the grippers in this case are supported for this movement. Further, the number of vacuum tips or other device grippers need not be twelve in number, but can easily be more or less than this. Moreover, the device need not include only a single row of device grippers—multiple rows could be pitch-adjusted in parallel. Such variations are many and are not limited to these examples. Accordingly, the invention is defined not by the particular embodiments and variations explicitly described herein, but by the claims below.

I claim:

1. A variable-pitch pick and place device for moving electronic devices, the pick and place device comprising:
    a support structure;
    a plurality of electronic-device grippers for picking up electronic devices, the grippers being coupled to the support structure such that the pitch or spacing between the grippers is adjustable;
    a pitch-controlling mechanism coupled to the grippers and operable to change the spacing between the grippers to thereby adjust the pitch of the grippers; and
    an electronically controllable pitch adjuster coupled to the pitch-controlling mechanism and operable to control the pitch-controlling mechanism to change the pitch of the grippers from a first pitch to a second pitch.

2. The device of claim 1 wherein the pitch adjuster includes a look up table, the pitch adjuster determining the second pitch from the look up table and controlling the pitch controlling mechanism to change the pitch to the second pitch based upon the value of the second pitch, determined from the look up table.

3. The device of claim 1 wherein the pitch adjuster comprises a servo motor and a position encoder connected to the pitch-controlling mechanism.

4. The device of claim 1 wherein the pitch-controlling mechanism comprises a pantograph linkage and the pitch adjuster comprises a servo motor and a position encoder connected to the pantograph linkage via a chain or timing belt.

5. A variable-pitch pick and place device for moving electronic devices, the pick and place device comprising:
    a support structure;
    a plurality of electronic-device grippers for picking up electronic devices; and
    a pantograph linkage coupled to at least a plurality of the grippers and the support structure so as to maintain an even spacing of the grippers along the given axis as said spacing is varied, the pantograph comprising a number of mechanical parallelograms formed by linked rigid beams, wherein the number of said parallelograms is less than the number of grippers minus one.

6. The device of claim 5 wherein the number of parallelograms is equal no greater than one-half of two less than the number of grippers.

7. A variable-pitch pick and place device for moving electronic devices, the pick and place device comprising:
    a support structure;
    a plurality of electronic-device grippers for picking up electronic devices;
    a pantograph linkage coupled to the grippers and the support structure so as to maintain an even spacing of the grippers and for varying the spacing of the grippers along a given axis, the pantograph comprising a series of mechanical parallelograms formed by rigid beams linked together, wherein the pantograph linkage is coupled to the support structure via a link positioned at a point within the middle third of the length of the pantograph, the link being structured to preserve the position of said point relative to the support structure in the direction along said axis.

8. The device of claim 7 wherein the pantograph linkage is connected to the support structure via a link positioned at the center of the pantograph.

9. A pick and place device for removing electronic devices from one holder and placing them in another holder, the device comprising:
    a plurality of electronic-device grippers arranged in a row for picking up said electronic devices from said one holder and placing said electronic devices on said other holder;
    a frame supporting said plurality of grippers from movement, in a first direction along the row;
    a linkage mechanism for adjusting for a difference in electronic device spacing between said one holder and the other holder during a picking and placing operation, the position of the linkage mechanism in the first direction relative to the frame being fixed at a given location along the linkage mechanism by a link between the linkage mechanism at the given location and the frame, the position in the first direction along the linkage mechanism of the given location being within the length of the row of grippers.

10. The device of claim 9 wherein the given location is positioned in the first direction within the middle third of the row of grippers.

11. The device of claim 9 wherein the linkage mechanism includes a roller and roller guides which constrain the roller to movement in a direction perpendicular to the first direction.

12. A pick and place device for removing electronic devices from one holder and placing them in another holder, comprising:
    a plurality of electronic-device grippers arranged in a row for picking up said electronic devices from said one holder and placing said electronic devices on said other holder; and
    a linkage mechanism connected to said grippers for adjusting for a difference in device spacing between said one holder and the other holder during a picking and placing operation, wherein the linkage mechanism comprises a scissors mechanism comprising a number of parallelograms formed by linked beams, the linked beams positioned such that a scissors motion of the scissors mechanism occurs along a vertical plane.

13. A pick and place device for removing electronic devices from one holder and placing them in another holder, the device comprising:
    a plurality of electronic-device grippers arranged in a row for picking up said electronic devices from said one holder and placing said electronic devices on said other holder;
    a frame supporting said plurality of electronic-device grippers moveably along the row;
    a linkage for adjusting the spacing between said grippers to accommodate for a difference in electronic device spacing between said one holder and the other holder during a picking and placing operation, the linkage structured to provide equal spacing between each respective gripper and to maintain the center of the row of grippers at a fixed position relative to the frame.

14. The device of claim 13 wherein the grippers comprise suction inlets for holding electronic devices using suction.

15. A pick and place device for removing electronic devices from one holder and placing them in another holder, the device comprising:
   a plurality of suction tips arranged in a row for picking up said electronic devices from said one holder and placing said electronic devices on said other holder;
   a linkage connected to each of the suction tips for adjusting the spacing between said suction tips to accommodate for a difference in electronic device spacing between said one holder and the other holder during a picking and placing operation, the linkage structured to provide equal spacing between each respective suction tip; and
   a flexible, electrically conductive tube in fluid and electrical connection with each suction tip for providing each suction tip with suction and with an electrical ground.

16. A variable-pitch pick and place device for moving electronic devices from one place to another while varying the pitch between the relative positions of said electronic devices, the pick and place device comprising:
   a support frame;
   a plurality of electronic-device gripper mechanisms for picking up electronic devices, at least all but one of the gripper mechanisms supported by the support frame movably along a first axis, each individual gripper mechanism having a movable member with a vacuum tip disposed thereon for using suction to grab electronic devices;
   a linkage connected to the gripper mechanisms and structured so as to maintain an even spacing of the gripper mechanisms along the given axis; and
   a common mechanical stop provided on the support frame for defining a limit to the range of motion of the movable members of the gripper mechanisms.

17. The device of claim 16 wherein the common stop defines a lower limit to the range of motion of the movable members.

18. The device of claim 16 wherein the movable members are movable in a vertical direction and wherein the first axis is horizontal.

19. A device for picking up and placing electronic devices during the fabrication or testing thereof and for adjusting the spacing between said electronic devices, the device comprising:
   a supporting structure including a horizontal rail with a longitudinal axis;
   a plurality of gripper mechanisms supported slidably on the horizontal rail, each gripper mechanism comprising a vertically movable portion for moving downward, toward an electronic device to be gripped or toward a position at which to deposit an electronic device, and upward, away from a deposited electronic device or toward a position at which to carry a gripped electronic device, and a device gripper for holding an electronic device, the device gripper being supported by the vertically movable portion of the gripper mechanism; and
   a linkage linked to the gripper mechanisms, the linkage structured so as to provide even spacing between successive gripper mechanisms, the linkage being coupled to the supporting structure at a first location along the length of the linkage other than at the end of the length of the linkage such that the first location is restrained against movement in a direction along the longitudinal axis of the rail.

20. The device of claim 19 wherein the linkage is also coupled to the supporting structure at second and third spaced apart locations such that varying the spacing between the second and third locations in a direction along the longitudinal axis of the rail varies the length of the linkage and the spacing between the gripper mechanisms.

21. The device of claim 20 wherein the second and third locations are at or adjacent to respective ends of the linkage and wherein the first location is at the middle of the linkage.

22. The device of claim 21 wherein said second and third locations are connected to said support structure via a tensile force-transmitting member.

23. The device of claim 19 wherein the linkage comprises a pantograph.

24. The device of claim 19 further comprising an optical-beam detector for detecting whether all of the vertically movable portions are in an up position.

25. The device of claim 19 further comprising an optical-beam detector for detecting whether any one of the vertically movable portions is in a down position.

26. A device for moving electronic devices from a holder having a first pitch to a holder having a second pitch different from the first pitch, the device comprising:
   a plurality of electronic-device gripper mechanisms; and
   a pantograph linkage comprising beams linked to other beams at pivot points at respective end portions thereof, said beams also being linked to other beams at crossover points at respective middles thereof, the linkage being coupled to at least a plurality of said gripper mechanisms, at least some of the gripper mechanisms coupled to the pantograph linkage being linked to the pantograph linkage by links each located midway between one of the crossover points and one of the pivot points.

27. The device of claim 26 wherein the pantograph linkage is arranged in a vertical plane.

28. The device of claim 26 wherein the pantograph linkage and the links which link the plurality of gripper mechanisms thereto are structured and arranged so as to cause said plurality of grippers to be disposed at equidistant points along a line.

29. The device of claim 26 in which the pantograph linkage has first and second ends, the device further comprising a continuous timing belt supported on a first pulley and a second pulley to form a loop around said pulleys, the loop having a first side and a second side opposite the first side, the timing belt being linked to the first end of said pantograph linkage at a position on the first side of the loop, the timing belt being linked to the second end of said pantograph linkage at a position on the second side of the loop.

30. The device of claim 29 wherein the pantograph is linked to the timing belt via respective gripper mechanisms.

31. The device of claim 26 further comprising a switch for detecting the maximum extension of the pantograph linkage.

32. The device of claim 26 further comprising a switch that serves as a home switch for power-up.

33. The device of claim 26 further comprising a switch for detecting the minimum extension of the pantograph linkage.

* * * * *